Figure 1:
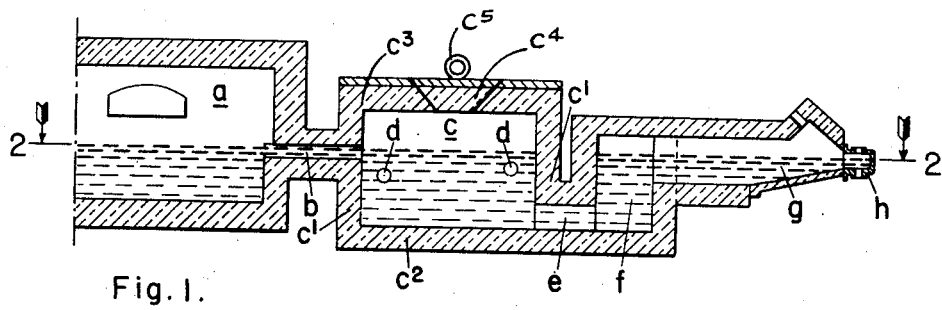

Oct. 1, 1957               R. E. LAMBERT               2,808,446

METHOD OF AND TANK FURNACE FOR MAKING GLASS

Filed Sept. 16, 1953

INVENTOR.
Roger Emile Lambert
BY
ATTORNEYS

United States Patent Office

2,808,446
Patented Oct. 1, 1957

2,808,446

METHOD OF AND TANK FURNACE FOR MAKING GLASS

Roger Emile Lambert, Paris, France, assignor to Societe Anonyme des Manufactures des Glaces et Produits Chimiques de St. Gobain, Chauny & Cirey, Paris, France Application September 16, 1953, Serial No. 380,576

18 Claims. (Cl. 13—6)

This invention relates to tank furnaces for glass, and is a continuation-in-part of my co-pending application Serial No. 603,725, filed July 7, 1945, for "Methods of and Tank Furnaces for Making Glass."

Glass tank furnaces as now used, and however they may be heated, are generally formed with three zones, called the melting zone, the fining zone and the working zone. In the melting zone the raw materials are melted; in the fining zone the melted glass is freed from bubbles; in the working zone the glass is cooled for delivery to forming apparatus.

These zones are either in free communication one with another or separated by fixed or floating dams, and are subjected to different temperature in a single furnace. The convection currents due to the cooling effect of the walls and to the differences of temperature between the zones, and also the current due to the flow of glass to the outlet, cause movement of glass from the melting zone to the working zone, through the fining zone, and a back movement from the working zone to the melting zone; and these back and forth movements take place in a mass of glass which is much greater than the mass which is daily withdrawn from the tank.

Hitherto, the fining and working zones have been given dimensions which are substantial relatively to the melting zone, for the reason that it has been considered necessary for effective fining that a large surface of glass free from foam should be exposed to the hot atmosphere of the tank, whatever the method of heating. It has in fact been considered necessary that all the glass should be exposed to the hot atmosphere of the tank for fining for a long time. Even in tanks in which the fining zone is separated from the melting zone, a large mass of glass remains for a long time in the fining zone.

In known furnaces containing a large mass of glass subjected to vigorous convection currents and presenting a large surface, it is necessary to prevent any glass with bubbles reaching a zone of lower temperature in which it can no longer be fined, with the risk of such glass being carried to the outlet. For this reason, it has hitherto been considered necessary to provide for a considerable mass of glass between the fining zone and the working zone, in which the glass is at high temperature, free from bubbles and comparatively undisturbed by convection currents.

The present invention comprises a method of making glass in a tank type of furnace, in which glass whilst still full of bubbles, is flowed in a unidirectional shallow stream from the batch melting zone, to the surface of a fining zone in a fining chamber that is substantially isolated from the melting and working zones of the furnace by walls or partitions, and in the fining chamber the upper portion of the glass so transferred is rapidly heated to fine the glass by causing an electric current to flow across the fining zone in the said upper portion thereof only, which fined glass is then allowed to settle in the fining chamber and is prevented from mingling with glass from the melting, or working zones until it is withdrawn from the lower portion of the fining chamber into a working zone, whereby unfined glass is prevented from reaching the working zone, and fined glass is prevented from returning to mingle with unfined glass.

This settling involves the sinking of the glass confined in the fining chamber to a position below the electrodes and electric currents that have fined it by the discharge of seeds, and the melting of stones, the cooling of the glass in the lower part of the fining chamber, the quieting of the glass in the regions below the electrodes, the stilling of currents, homogenization, and the production of a cooled and quieted glass that is closer to the temperature of actual use, and hence closer in structure to that in the working zone than has previously been the case of glass in fining zones.

According to my invention, glass is formed in a melting zone of a tank furnace and, while still full of bubbles, is caused to flow from the melting zone, in particular from the upper surface of the melting zone, along a channel throughout which the flow is towards the outlet of the tank, into a fining zone, the channel being located so as to lead the glass to the upper portion of the fining zone into the immediate neighbourhood of one of a plurality of current carrying electrodes disposed to heat the upper portion of the glass in the fining zone, whereby the glass with bubbles is rapidly heated and fined and sinks to the lower portion of the zone only when fined, and the fined glass is withdrawn from the lower portion of the zone into a working zone.

The glass from a single melting zone may be caused to flow through a plurality of channels, each leading to a fining zone, each fining zone delivering glass to a respective working zone.

An ingredient of the glass may be added at any fining zone and glasses of different kinds may be made simultaneously from a single melting zone by adding different ingredients into one or other of the fining zones.

A tank furnace constructed according to my invention comprises a melting zone heated by any known means sufficiently to form glass and render it liquid, a fining chamber separated from the other zones by barriers, a shallow channel leading from the surface of the glass in the melting zone to the surface of the glass in the fining chamber, submerged electrodes in the fining chamber disposed to heat only the upper portion of the glass in the fining chamber, a working zone, and a duct connecting only the lower portion of the fining chamber to a working chamber.

Alternately a tank furnace constructed according to my invention comprises a melting zone heated by any known means sufficiently to form the glass and render it liquid, a fining and conditioning chamber separated from the melting zone by a wall, a shallow channel connecting the melting and fining chambers at about the level of the glass surface, a submerged transverse horizontal electrode in the fining chamber close to the inlet wall thereof in a position to act as a physical barrier to the descent of the cold glass issuing from the inlet, at least one other transverse submerged horizontal electrode, also near the surface, a working chamber separated from the fining chamber, and a duct connecting the lower portion of the fining chamber to a working chamber.

The fining zone may be in a portion of the tank separated from that of the melting zone except by a channel, or in a substantially separate tank. A plurality of chambers acting as fining and cooling and settling zones may each be connected by shallow channels with the melting chamber, and by a duct with a working chamber. The working chamber may be exceptionally small and hence of superior heat efficiency.

Figure 2:
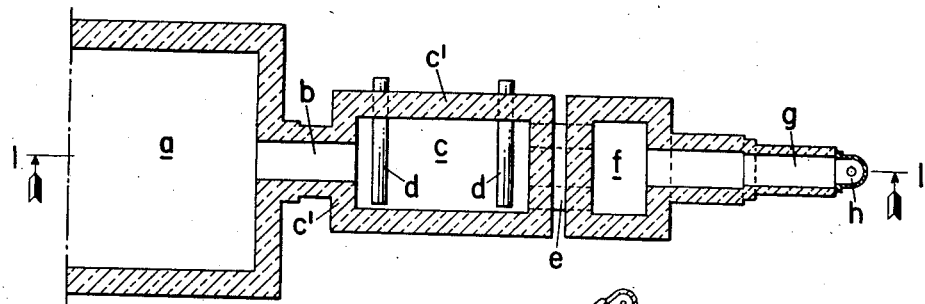
Figure 3:
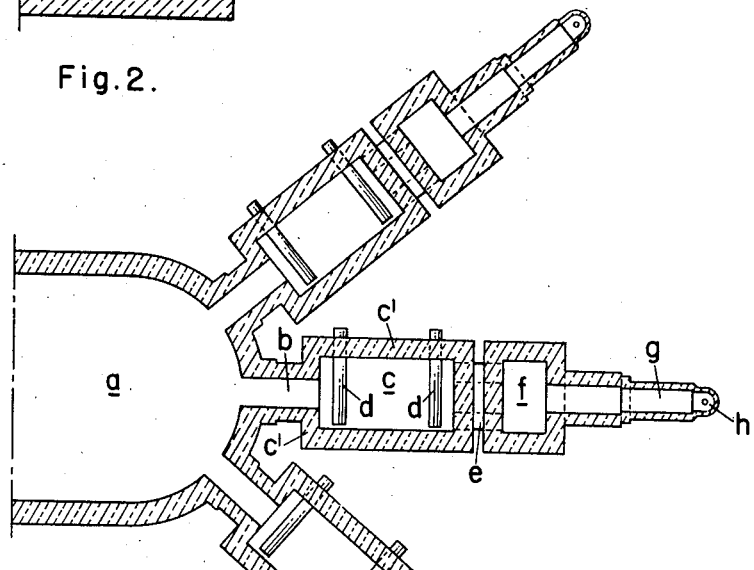

In the accompanying drawings, which show by way of example, one way of carrying out the invention, Figure 1 is a vertical section through a tank furnace along the line 1—1 of Figure 2, including only part of the melting zone, Figure 2 is a horizontal section along the line 2—2 of Figure 1, and Figure 3 shows a modification in which separate fining compartments are fed from a single melting compartment in accordance with the principles of the invention.

Referring to the drawings, the melting zone $a$ is of usual type for heating by gas; the fining zone $c$ is in a tank with walls $c_1$, base $c_2$ and crown $c_3$, separated from the melting zone except for the channel $b$ connecting the two zones at glass level. A section $C^4$ of the roof of the fining chamber C is provided with eye means $C^5$ by which it can be lifted to permit the addition of materials, as elsewhere herein described.

The liquid glass full of bubbles flows through the channel $b$ into the fining zone and the channel is made so shallow that no back convection current occurs, so that the flow throughout the channel is in the direction of the outlet of the tank.

The glass in the fining zone $c$ is heated by submerged horizontal electrodes $d$, two of which are shown including one close to the inlet wall, while the other is near the outlet wall. Current supplied to the electrodes flows between them through the upper portion of the glass in the fining zone and heats this portion of the glass to the high temperature adapted to fining.

Glass enters from the channel $b$ into the immediate neighbourhood of the electrode and is thus rapidly heated and, by reason of its lightness, remains in the upper portion of the glass until all bubbles in it have escaped and it becomes heavy enough to sink to the lower portion of the fining zone.

The unfined glass remains in the upper portion of the fining zone because it is lighter than the fined glass, firstly, by reason of its bubble content and, secondly, because the heating is localized in the upper part of the zone, with the result that the entering glass is at once raised to a high temperature.

By reason of the localization of the heating in the upper part of the fining zone, the temperature of the glass here can be such that fining is effected with great rapidity. The size of the tank portion $c$ may therefore be reduced until the volume of glass in it is very small compared with the volume customary in fining zones. The horizontal section may be reduced until the whole surface is covered with foam from the released bubbles, indicating that the fining operation is occurring over the whole surface. The transverse section may be reduced to one and a half square feet, or less, per ton of glass delivered per 24 hours, and the volume of glass in the zone may be reduced to one-third, or less, of the volume delivered per 24 hours.

As a result of the small dimensions of the fining zone, the heat losses are greatly diminished.

As a result of the localized heating at the surface, and over the whole surface, convection currents are substantially confined to the upper portion of the glass in the fining zone, and the fined glass in the lower portion is not mixed with the unfined glass.

The fining zone $c$ is connected with the working zone by a duct of small cross section $e$ leading from the bottom of the fining zone to the working zone $f$, whence the glass flows along the channel $g$ to the outlet $h$.

There is then a steady flow of glass, substantially unidirectional from the upper portion of the fining zone downwards to the bottom portion, and through the duct $e$ to the outlet $h$, and the glass is progressively cooled over the whole of its passages from the high temperature at the surface of the fining zone to the outlet, where it is close to the temperature of glass in the working zone, and as a result, there is little, or no, tendency for unfined glass to reach the working zone, or for cooled glass from the working zone to return by convection to the fining zone. Thus, the operations of melting, fining, cooling, and working are maintained distinct.

An advantage consequent, on this separation of functions, is that the output of the whole tank can be varied, even from full output to half output, without impairing the quality of glass delivered.

Two or more tank portions for fining zones, each leading to a working zone, may be connected by channels $b$ to a single melting zone, and different heat treatments may be applied to the different fining and working zones.

It has, moreover, been found that coloured glass may be made in which the colouring substance is added to the glass in the fining zone. Since back flow of glass from the fining zone to the melting zone is avoided, glasses of two different colours may be made from glass in a single melting zone, by connecting thereto two tank portions for fining zones, into which the substances for the two colours, respectively, are added. Similarly, glasses of different compositions may be made by adding materials to the glass in the fining zones.

As many apparently widely different embodiments of the present invention may be made without departing from the spirit and scope thereof, it is to be understood that the invention is not limited to the specific embodiments.

What is claimed is:

1. Method of making glasses of different kinds which comprises making a pool of crude glass containing bubbles, establishing separate smaller pools of glass, heating the tops of said smaller pools to fining temperature by passing Joule effect currents of fining intensity through the upper parts of said fining pools only, leaving the lower portions of said pools at a temperature less than that necessary for fining, introducing the crude glass while still full of bubbles onto the top of the fining pools over the Joule effect currents, and drawing glass away from the said lower and cooler parts of the pools and the glass in the said upper parts of the pools into the said lower parts thereof at a rate which completes the fining before the effect of the Joule effect currents is lost, and adding an additional ingredient to a said fining pool whereby to produce different glasses from the same melt.

2. A method of making glasses of different kinds from glass derived from a single melting zone, which comprises causing glass full of bubbles to flow from the surface of the melting zone through a plurality of shallow channels each leading to the upper portion of a glass bath in a corresponding fining compartment, adding an ingredient of a glass into at least one of the fining compartments, the upper portion of the glass bath in each fining compartment being maintained by Joule effect at such an elevated temperature as to ensure fining of the whole superimposed layer of bubbly glass while the bottom of said glass bath is maintained at a lower temperature, and continuously feeding a plurality of working zones with the fined glass of the fining compartments, in compensation for glass taken therefrom, by constraining a flow of fined glass away from the bottom portion of each fining compartment to the corresponding working zone.

3. A method of fining glass which comprises establishing separate melting and fining and working pools, transferring crude glass from the melting pool onto the top of the fining pool, heating the crude glass and the fined glass contiguous thereto to fining temperature by passing an electric current therethrough, thus substantially confining convection currents to the upper part only of the said pool, cooling and quieting the portion of said pool below said crude and current filled glass, and drawing off glass into the said working pool from the said cooled and quieted glass beneath said current filled glass.

4. A glass making furnace comprising a melting tank in which batch material is fused to form crude, bubble containing glass, a separate fining tank, conduit means, consisting of a channel narrow with respect to the width and shallow with respect to the depth of said tanks connecting the tanks near the level of the upper surface of the glass in said tanks, through which the glass at the top of the pool in the melting tank flows to the top of the pool in the fining tank, the transverse horizontal glass section in the fining tank being not substantially over one and a half square feet per ton of glass delivered by said fining tank per 24 hours, horizontal Joule effect electrodes submerged in the top of the glass in the fining tank, one of said electrodes being near and somewhat below the outlet from said channel, another said electrode being adjacent the wall of said fining tank opposite said channel whereby to heat the whole upper surface of glass in said fining tank to fining temperature, an outlet beneath said electrodes leading to a separate working tank, the depth of said fining tank between said electrodes and said outlet being sufficient to cool the fined glass before it passes into said working tank.

5. A glass making furnace comprising a melting tank containing heating means by which batch material is converted into crude glass in a fused state containing bubbles, a plurality of separate fining tanks each of which is connected to said melting tank by a separate channel which is limited to the upper level of the glass in such fining tank, such channel being shallow with respect to the depth of the fining tank, Joule effect electrodes localized in the top of the glass in at least one said fining tank and disposed so as to heat the incoming crude glass and only the upper part of the glass in the fining tank to fining temperature, means to admit additive material to the glass at fining temperature in said one fining tank, an outlet in said one fining tank at a level sufficiently below the level of said electrodes to cool the fined glass before it reaches said outlet, and a duct leading the cooled glass to a working tank.

6. Method of making glass in a tank type of furnace, in which crude glass while still full of bubbles, is flowed substantially horizontally in a unidirectional shallow stream onto the top of still glass in an isolated pool, confining the said pool to prevent horizontal movement thereof, heating the glass in the top of the pool strongly to a temperature sufficient to fine the glass by passing Joule effect current through the top of the pool only, and drawing glass, from the bottom of the pool only, into a separate working pool, the fined glass from the top of the said fining pool being drawn downward, through the Joule effect currents in the top of the said isolated pool into a cooler and calmer zone substantially free of Joule effect currents, and passing from the lower and cooler portion of the said isolated pool only, into the said separate working pool.

7. In a method of making glass in which crude glass is made by fusing raw materials, is fined, and is worked, the method of fining in which a pool of glass is formed and horizontally confined except for an inlet at the upper surface and an outlet at the bottom of the said pool, and is kept apart from the glass masses made by fusion and those which are being worked, flowing crude glass still full of bubbles substantially horizontally onto the top of the said pool, subjecting the top of said pool only to the passage therethrough of Joule effect current of intensity sufficient to fine the said crude glass, the said pool having horizontally unmoving depths below and not subject to the passage of fining currents, or to admixture with crude glass or the glass undergoing working, and drawing still glass from the bottom into the glass masses undergoing working whereby the glass undergoing Joule effect fining is drawn downward out of the said Joule effect fining currents into said depths.

8. Method of making glass in a tank type of furnace, which comprises making a pool of crude glass containing bubbles, establishing a separate smaller pool of glass, flowing the crude glass while still containing bubbles in a unidirectional shallow stream onto the top of the glass in said separate pool, heating the glass in the top of the separate pool to a temperature sufficient to fine the glass by passing Joule effect current of fining intensity through the top of the pool only, leaving the lower portion of said separate pool at lower temperatures and drawing glass from the lower portion of said separate pool and the fined glass from the top of the said separate pool downward through the Joule effect current in the top thereof into said lower portion at a rate which completes the fining before the effect of said Joule effect current is lost.

9. In a method of making glass comprising forming separate pools for melting, fining, and working, flowing crude glass still full of bubbles from the melting pool onto the top of the said fining pool, maintaining said bubbly glass on the top of the fining pool by passing Joule effect current of intensity sufficient to fine the said crude glass only through the upper layers of said fining pool, leaving the lower portion of said fining pool at lower temperatures and substantially free of said fining current, and drawing glass from the lowest part of said lower portion into the said working pool at a rate which completes the fining of the glass in the part of the fining pool heated by Joule effect current before it is drawn downward out of the Joule effect current into said lower portion.

10. Tank furnace for the manufacture of glass comprising a melting compartment heated by any known means sufficiently to form glass and render it liquid, a fining and cooling compartment separated by physical means from the melting compartment, an aperture extending through the physical means at about the level of the free surface of the glass in the fining and cooling compartment, said aperture delivering glass horizontally to the top levels of glass in the fining and cooling compartment, submerged electrodes localized in the top levels of the glass in the fining and cooling compartment, said electrodes comprising at least one electrode below the point of discharge of the said aperture, said fining and cooling compartment being of material depth beneath said electrodes whereby the glass in the top of the fining and cooling compartment is directly and strongly heated by said electrodes while that beneath such heating means is quieted and cooled, a physically separate working compartment, and a duct connecting the lower portion of the fining and cooling compartment to the working compartment.

11. The method of making glass that comprises melting the glass in a pool, establishing a separate pool by transferring glass from the melting pool, restricting the glass in said separate pool against return to the melting pool, fining the upper part of the glass in the said separate pool by Joule effect currents, settling and cooling the fined glass in the bottom of said separate pool substantially out of and beneath the fining effect of such Joule effect currents, establishing a separate working pool at a temperature near that of the settled glass in the said separate fining and settling pool, and transferring settled glass to said separate working pool.

12. In the process of making glass that includes heating the crude material apart from the fining zone until a melted, unfined glass is formed, and transferring a part of the melt to the glass in the fining zone near the surface thereof, the steps that comprise adding an ingredient of the glass to the said transferred part of the melt after it leaves the melting zone and before it leaves the upper level of the fining zone, and heating the upper part of the glass in the fining zone by passing a current of electricity through it with enough intensity to keep the said transferred glass on top of the glass in the fining zone until it has been fined.

13. The method of fining and cooling crude glass that comprises establishing an isolated fining and cooling pool of glass, heating the upper levels only of said pool to fining temperature by heating means localized in said upper levels, leaving the lower levels at lower temperature, flowing the crude glass into the glass in said pool above said heating means, fining said glass above said heating means, and drawing the glass when fined down below the glass at fining temperature into the cooler levels of said pool.

14. Tank furnace for the manufacture of glass comprising a melting compartment heated by any known means sufficiently to form glass and render it liquid, a fining and cooling compartment separated by physical means from the melting compartment, a passage, at about the level of the free surface of the glass in the fining and cooling compartment, delivering glass from the melting compartment to the top levels of glass in the fining compartment, at least one electrode localized in the top levels of the glass in the fining and cooling compartment near the wall of the fining and cooling compartment opposite to the passage delivering glass, at least another electrode of different polarity localized in the upper levels of the glass in said fining and cooling compartment combining with said electrode to heat the whole of the upper layers of the glass in said fining and cooling compartment, said fining and cooling compartment being of material depth beneath the said electrodes whereby the glass in the top of the fining and cooling compartment is strongly heated while that at the bottom is not so heated, a physically separate working compartment, and a duct connecting the lower portion of a fining and cooling compartment to the working compartment.

15. The furnace of claim 14 in which the electrodes are of a rod type.

16. The furnace of claim 14 in which at least one electrode localized near the wall of the fining and cooling compartment opposite to the passage delivering glass extends across practically the whole width of said wall.

17. A method of manufacturing glass that comprises establishing a melting pool and preparing molten glass therein, establishing a plurality of separate fining pools and flowing unfined glass from the said melting pool to said fining pools, heating the unfined glass in each fining pool to fining temperature and thereby establishing in the fining pools more heated localized portions and convection currents, adding an ingredient the presence of which is desired in the product of one fining pool to the glass after it leaves the melting pool and before it leaves the said one fining pool, thereby utilizing the said convection currents and the said more heated localized portions to distribute and incorporate the said ingredient in the glass, and withdrawing the glass to which the ingredient has been added from the more heated localized portions and convection currents of said one fining pool as the incorporation of the added ingredient is completed, and cooling and quieting the glass containing the added ingredient after said withdrawal.

18. A method of manufacturing glass that comprises establishing a melting pool and preparing molten glass therein, establishing a plurality of separate fining pools and flowing unfined glass from the said melting pools to said fining pools, heating the unfined glass in at least one of the fining pools to fining temperature and thereby establishing in the said one fining pool more heated localized portions and convection currents, adding an ingredient the presence of which is desired in the final production to the glass of said one fining pool after it leaves the melting pool and before it leaves the said one fining pool, thereby utilizing the said convection currents and the said more heated localized portions to distribute and incorporate the said ingredient in the glass, and withdrawing the glass to which the ingredient has been added downward from the more heated localized portions and convection currents as the incorporation of the added ingredient is completed, and cooling and quieting the glass containing the added ingredient after said withdrawal.

References Cited in the file of this patent

UNITED STATES PATENTS

| Number | Name | Date |
|---|---|---|
| Re. 12,323 | Richardson | Feb. 28, 1905 |
| 698,766 | Voelker | Apr. 29, 1902 |
| 766,771 | Richardson | Aug. 2, 1904 |
| 972,778 | Sauvageon | Oct. 11, 1910 |
| 1,186,076 | Chambers | June 6, 1916 |
| 1,552,555 | Grauel | Sept. 8, 1925 |
| 1,581,338 | Ferngren | Apr. 20, 1926 |
| 1,593,054 | Arbeit | July 20, 1926 |
| 1,594,496 | Clark | Aug. 3, 1926 |
| 1,596,058 | Mambourg | Aug. 17, 1926 |
| 1,611,328 | Arbogast | Dec. 21, 1926 |
| 1,744,359 | Brown | Jan. 21, 1930 |
| 1,815,978 | Hitner | July 28, 1931 |
| 1,880,541 | Wadman | Oct. 4, 1932 |
| 1,937,390 | McKinley et al. | Nov. 28, 1933 |
| 1,953,023 | Mulholland | Mar. 27, 1934 |
| 1,953,034 | Willetts | Mar. 27, 1934 |
| 2,064,546 | Kutchka | Dec. 15, 1936 |
| 2,115,408 | Brosse | Apr. 26, 1938 |
| 2,119,949 | Blau et al. | June 7, 1938 |
| 2,123,544 | Morton | July 12, 1938 |
| 2,254,079 | McAlpine | Aug. 26, 1941 |
| 2,293,948 | Peyches | Aug. 25, 1942 |
| 2,294,373 | Batchell | Sept. 1, 1942 |
| 2,313,217 | Borel | Mar. 9, 1943 |
| 2,397,852 | Gentil | Apr. 2, 1946 |
| 2,413,037 | De Voe | Dec. 24, 1946 |

FOREIGN PATENTS

| Number | Country | Date |
|---|---|---|
| 262,535 | Great Britain | Dec. 16, 1926 |
| 597,838 | Great Britain | Feb. 4, 1948 |
| 921,568 | France | Jan. 13, 1947 |